United States Patent
Saitoh

(10) Patent No.: US 6,400,920 B1
(45) Date of Patent: Jun. 4, 2002

(54) DEVICE AND METHOD FOR RECOVERING VAPOR OF A DEVELOPER MEDIUM

(75) Inventor: Junichi Saitoh, Yamagata (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/713,211

(22) Filed: Nov. 16, 2000

(30) Foreign Application Priority Data

Nov. 17, 1999 (JP) .......................................... 11-327434

(51) Int. Cl.⁷ .............................................. G03G 15/10
(52) U.S. Cl. ...................................... 399/249; 399/250
(58) Field of Search .............................. 399/249, 250, 399/251; 347/89, 90, 91, 92, 93; 34/73, 76, 77

(56) References Cited

U.S. PATENT DOCUMENTS 5,737,674 A * 4/1998 Venkatesan et al. ........ 399/250
6,085,055 A * 7/2000 Shin et al. .................. 399/250
6,101,356 A * 8/2000 Kim et al. ................... 399/250

* cited by examiner

*Primary Examiner*—Sophia S. Chen
*Assistant Examiner*—Hoan Tran
(74) *Attorney, Agent, or Firm*—Young & Thompson

(57) ABSTRACT

A capacitor base and a partition plate laminated thereon are fixed to the bottom of a capacitor column. Openings in the partition plate are filled with air stones that are solidified ceramics. A predetermined amount of developer medium is stored in the capacitor column. Hot vaporized developer medium and water vapor are sucked through a suction port from an image drier of an electrophotographic device, and are passed through a channel of the capacitor base. Then, the vapor is discharged toward the bottom of the partition plate having no air stones, generating bubbles after being passed through the air stones, and is then cooled and liquefied. By cooling to an appropriate temperature with a Peltier element, only the vaporized developer medium is selectively liquefied without liquefying the water vapor. The developer medium that is liquefied from vapor is returned to the developing process of the electrophotographic device for reuse.

14 Claims, 6 Drawing Sheets

(WATER VAPOR - DEVELOPER MEDIUM)

DEVICE AND METHOD FOR RECOVERING VAPOR OF A DEVELOPER MEDIUM

BACKGROUND OF THE INVENTION

1. Field of the Invention

The present invention relates to a device and a method for recovering developer medium. More particularly, the device and the method of the present invention absorb only the developer medium which is dispersed in toner images on a photoreceptor, by an image dryer in a color laser printer which forms multi-color images by a wet type electrophotographic recording technology. Moreover, the present invention relates to a device and a method for recovering developer medium by using a cooling device that cools and then liquefies the developer medium vaporized at an image drier.

2. Description of the Related Art

FIGS. 1 and 2 are a perspective view and a cross-sectional view of a conventional vapor recovery device of developer medium, respectively.

This conventional vapor recovery device of developer medium has a metal mesh 206 at the bottom of capacitor columns 207, and delivers vaporized developer medium below the metal mesh 206 through pipes that constitute inlet ports 202 at the center of the capacitor columns 207. When an electrophotographic device is started, an initial developer medium is supplied from a supply port 210 into the capacitor columns 207. The quantity of the developer medium increases as the vaporized developer medium is liquefied, and overflows to the outside from the capacitor columns 207 through a recovery port 208.

To an outside wall of the capacitor columns 207, a Peltier element 205 is connected to cool the developer medium. A heat sink 204 is connected to the Peltier element 205, and a cooling fan 203 is mounted onto the heat sink 204 for cooling.

In the conventional vapor recovery device of developer medium shown in FIGS. 1 and 2, the metal mesh 206 is used to generate bubbling (subdividing the vaporized developer medium into bubbles in the developer medium). Moreover, liquefaction efficiency by bubbling is controlled by providing a plurality of partition panels 209 having about 50 holes of about 1 mm in diameter inside the capacitor columns 207. In this case, liquefaction efficiency is low, considering the high pressure loss. Thus, the gas quantity of vaporized developer medium passing through each capacitor column 207, must be suppressed without choice, and the device is significantly large having many parts in which quadruple capacitor columns 207 are joined as shown in FIG. 1.

The conventional vapor recovery device of developer medium shown in FIGS. 1 and 2 has the following problems.

Liquefaction efficiency is low, considering the high pressure loss.

In order to obtain constant liquefaction efficiency, the gas quantity of vapor passing through each capacitor column has to be suppressed to several liters per minute. As a result, the capacitor has to have a quadruple multi-column structure as shown in FIG. 1.

As shown in FIG. 2, the bubbling mechanism is complex, and the unit and electric power use are also large. Particularly, when the capacitor columns are shorter than a certain length, liquid will flow out of the capacitor.

The liquid temperature of preliminarily stored developer medium has to be decreased to about 5° C. so as to maintain liquefaction efficiency. As a result, the water contained in the vaporized developer medium is condensed inside the capacitor columns, and recovered developer cannot be reused. Moreover, the wattage of the Peltier element has to be large enough to allow liquid temperature to decrease to around 5° C. when the power is turned on.

Additionally, this process is time consuming.

SUMMARY OF THE INVENTION

Accordingly, it is an object of the present invention to selectively liquefy vaporized developer medium, and to remove moisture from recovered developer medium for reuse without liquefying water vapor.

It is another object of the present invention to improve liquefaction efficiency of vaporized developer medium.

According to an aspect of the present invention, a vapor recovery device of developer medium is provided. The vapor recovery device has a capacitor column that can store the developer medium at the bottom, air stones provided at the bottom of the capacitor column, a suction port to transmit vaporized developer medium to the bottom of the air stones, and a cooling device to cool the developer medium inside the capacitor column and the vaporized developer medium to a constant temperature.

According to another aspect of the present invention, a vapor recovery device of developer medium is provided.

The vapor recovery device has a capacitor column that can store the developer medium at the bottom, air stones provided at openings of a partition plate at the bottom of the capacitor column, a capacitor base which is attached to the bottom of the partition plate at the periphery thereof and has a hollow section below the air stones and partially below the partition plate, a suction port which is provided at an inner surface of the hollow section to transmit vaporized developer medium toward the bottom of the partition plate having no air stones, and a cooling device to cool the developer medium in the capacitor column and the vaporized developer medium to a constant temperature.

According to still another aspect of the present invention, a vapor recovery device of developer medium is provided that absorbs only the developer medium scattered in toner images on a photoreceptor of an electrophotographic device by an image dryer and recovers vaporized developer medium. The vapor recovery device has a capacitor column that can store the developer medium at the bottom, air stones provided at the bottom of the capacitor column, a suction port to transmit the vaporized developer medium to the bottom of the air stones, a cooling device to cool the developer medium in the capacitor column and the vaporized developer medium to a constant temperature, a suction device to suck the vaporized developer medium inside the capacitor column and transmit it into a shell space having the photoreceptor and the image drier inside, a pipe which connects the image drier to the suction port to transmit the vaporized developer medium absorbed by the image drier to the suction port, and a recovery device to transmit the developer medium inside the capacitor column by an additional amount which is greater than an initial constant liquid level and thus overflows, to a developer medium storing section.

According to yet another aspect of the present invention, a vapor recovery method of developer medium is provided. The developer medium is stored at the bottom of a capacitor column having air stones at the bottom, and vaporized developer medium is transmitted to the bottom of the air stones, thus subdividing the vaporized developer medium into bubbles in the developer medium inside the capacitor column for cooling and liquefying.

Furthermore, according to the present invention, a vapor recovery method of developer medium is provided. The method includes the steps of transmitting developer medium by a quantity greater than an initial constant liquid level into a capacitor column which can store the developer medium at the bottom, by operating a supply device as an electrophotographic device is started, cooling the developer medium stored in the capacitor column and the vaporized developer medium to a constant temperature by a cooling device, transmitting the developer medium to a developer medium storage section from the capacitor column by a recovery device while leaving only a quantity of the initial liquid level, transmitting the vaporized developer medium inside the capacitor column by a suction device into a shell space having a photoreceptor of the electrophotographic device and an image drier inside while the electrophotographic device is forming images, sucking the vaporized developer medium absorbed by the image drier into the capacitor column from a suction port below air stones at the bottom of the capacitor column, and starting the recovery device by stopping the suction device at a constant cycle after image forming operations end, thus delivering the developer medium inside the capacitor column into the developer medium storage section while keeping only the quantity of the initial liquid level.

DESCRIPTION OF THE PREFERRED EMBODIMENT

Subsequently, the embodiments of the present invention will be explained in detail, with reference to the drawings.

Figure 5:
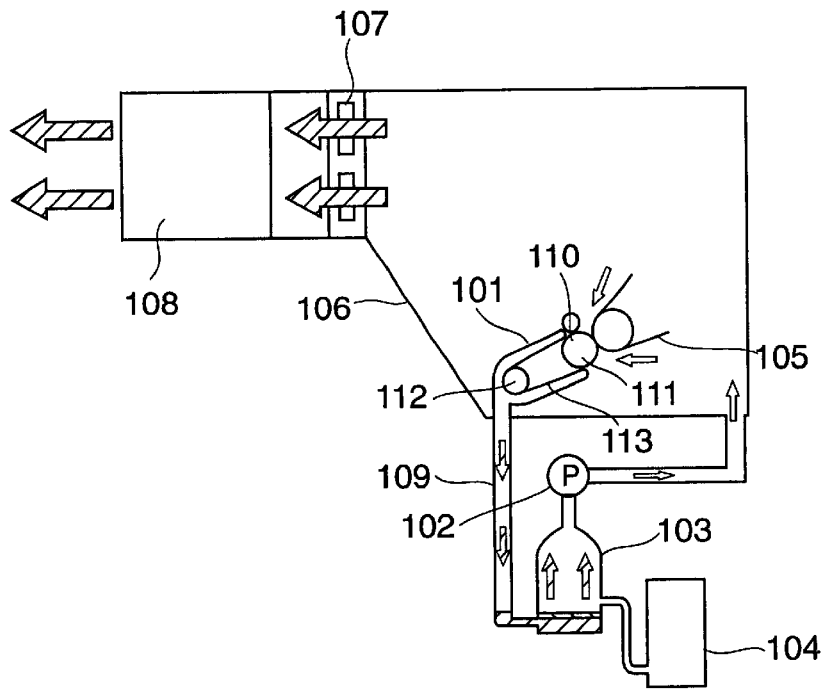
FIG. 5 is a schematic configuration of an electrophotographic device using a capacitor shown in FIG. 3.

FIG. 5 is a configuration, showing an electrophotographic device having a vapor recovery device of developer medium of an embodiment of the present invention.

In FIG. 5, a photoreceptor 105 is charged by a corotron or scorotron. Subsequently, image information is irradiated (written) onto the photoreceptor 105 per dot by an exposure source such as a laser and LED. A developing device performs reversing development. (The corotron, scorotron, laser, LED and developing device are not shown in the drawing.) In forming images with the present device, images of YMCB (yellow, magenta, cyanogen, black) are visualized on the belt-form photoreceptor 105 in a proper order by a liquid multi-color developer containing a solid toner, thus performing multi-color superposition and forming multi-color images on the photoreceptor 105.

Although the developer medium of the multi-color images on the photoreceptor 105 is pressed and squeezed between a roller in the developing device and an opposing roller in the photoreceptor, the medium is still wet and contains a large quantity of liquid. Additionally, a ratio of the solid toner (solid ratio) in the developer is still around 70%, so that the developer medium cannot be transferred onto a recording medium. The liquid in the developer medium consists of a liquid carrier and other components, and developing solvent as a main medium of the developer is a hydrocarbon-based material.

Subsequently, the images of developer medium on the photoreceptor 105 are dried thoroughly before being transferred onto paper. When four colors are superposed, solid toner should be in a film form of several microns to several dozen microns. For drying (filming), an image dryer 110 in FIG. 5 is necessary to absorb only a liquid component from the developer of the images on the photoreceptor 105 and to increase the solid ratio of the developer of the images to about 95% to 97%. The images on the photoreceptor 105 are then printed onto recording medium after a transfer process and a fixing process (not shown in the figure).

The image dryer 110 in FIG. 5 has a drying belt 113 as a functional member that is held across a roller 111 and a heat roller 112 having a heat source therein. A portion of the drying belt 113 held at the roller 111 is in contact with the photoreceptor 105 in the image dryer 110. The developer medium is absorbed once in a liquid condition from the photoreceptor 105 into the drying belt 113, and is then heated and vaporized by the heat roller 112. The vaporized developer medium is diffused from the drying belt 113.

A portion of the drying belt 113, except for the portion in contact with the photoreceptor 105, is covered and closed with a manifold 101. The vaporized developer medium diffused from the drying belt 113 is sucked into a capacitor (vapor recovery device of developer medium) 103 by a suction device 102 such as an air pump in an arrow direction shown in FIG. 5 through a pipe 109 connected to the manifold 101. The vaporized medium is then passed through the liquid developer medium that is preliminarily cooled by a cooling element and is filled in the capacitor 103. As a result, the temperature of the vapor is lowered, changing phases from vapor to liquid. The developer medium, which is collected by liquefying vaporized developer medium, contains no water and is pure as described later. Thus, the medium is transferred by the pump to a developer producing section 104 which produces a developer medium for use in a developing process at a developing device, and is then mixed with a solid toner for reuse as reproduced developer medium.

In other words, an electrophotographic device may be provided that circulates a small quantity of developer medium without replenishing it in the process. The liquefaction efficiency herein reaches 95% or above. On the other hand, the remaining vaporized developer medium of about 5% is returned to a shell space 106 which has the image dryer 110, the photoreceptor 105 and so forth inside and is closed to some extent, thus recovering the vaporized developer medium.

Air inside the shell space 106 is released outside of the device by an exhaust fan 107 through a filter 108 made of activated carbon or the like. The filter 108 absorbs the vaporized developer medium, and the concentration of the vaporized developer medium in the air for exhaustion is reduced to 3 ppm or below. Accordingly, the exhaust air is thoroughly deodorized.

Figure 3:
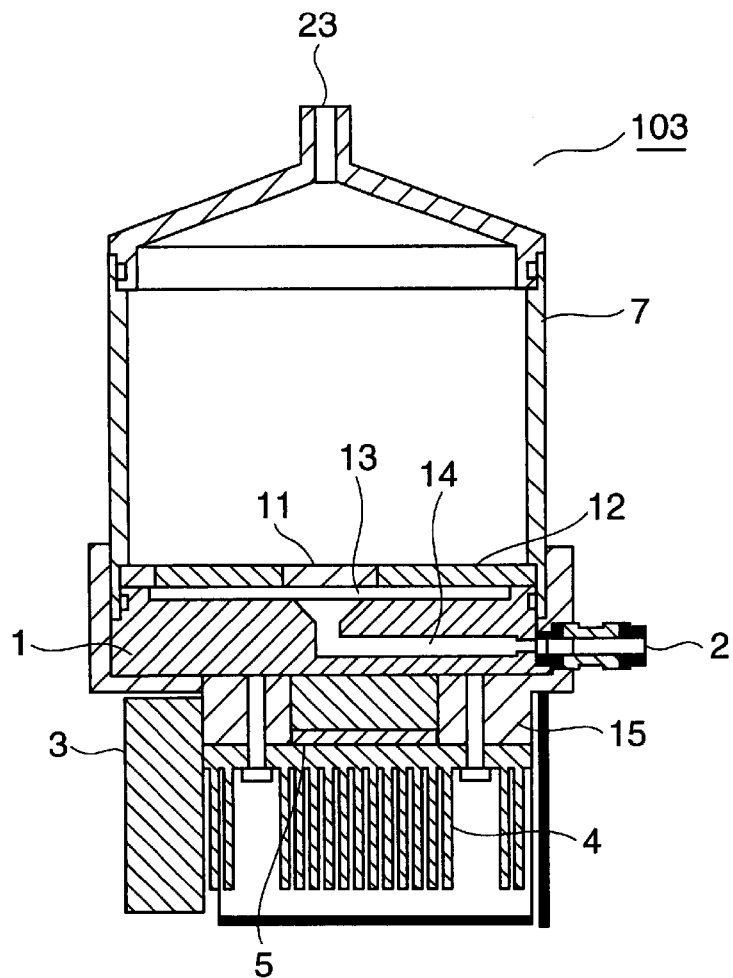
FIG. 3 is a cross-sectional view of a vapor recovery device of developer medium according to an embodiment of the present invention.

FIG. 3 is a cross-sectional view of the capacitor 103.

Figure 1:
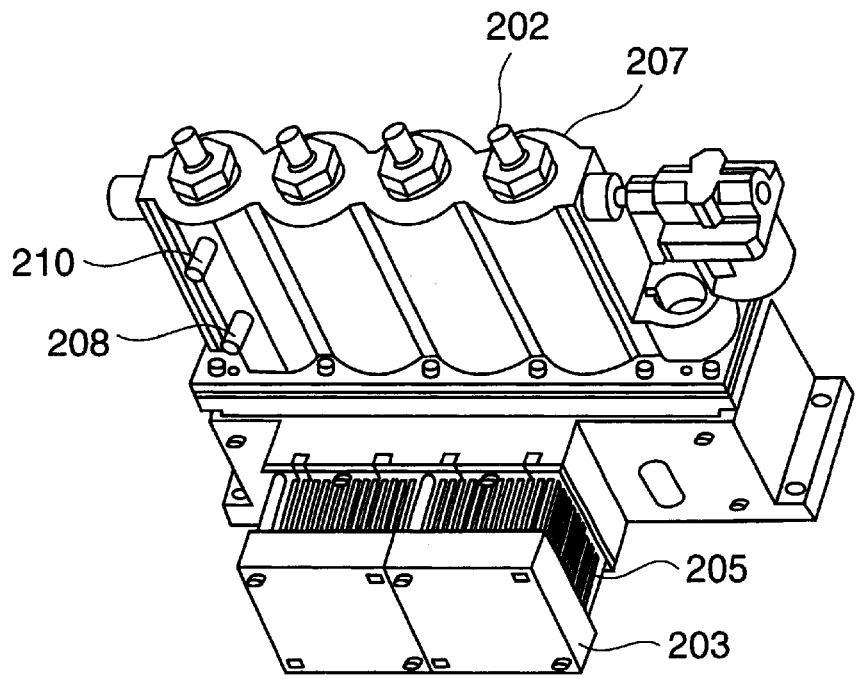
FIG. 1 is a perspective view of a conventional vapor recovery device of developer medium.

The capacitor 103 is different from the conventional capacitor shown in FIG. 1, and has only one capacitor column 7. The capacitor 103 may be divided into two major sections based on functions. The first section is the capacitor column 7 that is a closed container to store a developer medium in advance and then draw in vaporized developer medium for liquefaction. The second section is a section to cool the capacitor column 7 that is filled with developer medium.

Plastic is used for the first section, the capacitor column 7, as a material having excellent solvent resistance and low heat transfer coefficient. A material having a high heat transfer coefficient such as aluminum is used for the sidewall of the cylindrical container and the conical lid portion of the container. The capacitor column 7 includes a partition plate 11 and a capacitor base 1 at the bottom of the container, thus forming a closed space.

Figure 4:
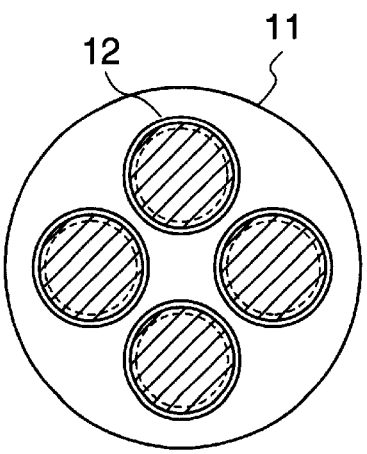
FIG. 4 is a plan view of a partition plate in FIG. 3.

The partition plate 11 is laminated on the capacitor base 1, and the partition plate 11 and the capacitor base 1 are fixed to the bottom of the capacitor column 7. FIG. 4 is a plan view of the bottom of the closed space of the capacitor 103, in other words, the disc-form partition plate 11. The partition plate 11 has a plurality of openings on a concentric circumference at equal intervals, and air stones 12 are filled in these openings. A hollow part 13 is provided at the top of the capacitor base to entirely cover the bottom of the air stones 12. A suction port 2 is provided at the side surface of the capacitor base 1. The suction port 2 is connected to one end of a channel 14. The other end thereof is opened at the bottom of the hollow part 13 toward the center of the partition plate 11 having no air stones 12, thus reducing the suction pressure of vaporized developer medium and scattering the medium. In the capacitor 103 in FIG. 3, vaporized developer medium enters from below and is released toward the top.

The cooling section as the second section of the capacitor 103 uses a Peltier element 5. The Peltier element 5 collects heat from the developer medium in the capacitor column 7 through the partition plate 11 and the capacitor base 1, and transmits the heat to a heat sink 4. The heat of the heat sink 4 is subsequently released outside by a cooling fan 3. Moreover, as certain sections of the Peltier element 5 and the capacitor base 1 have to be kept cold, the periphery of the sections is covered with a heat insulating material 15 to insulate against external heat.

The air stones 12 consist of 93 wt. % of alumina as a main component and silica, titania, magnesia, calcia, yttria and so forth as subsidiary components. Alumina powder as a main component is sintered to 100 to 150 microns in particle diameter. The average pore diameter of the air stones 12 is 50 microns, and the porosity thereof is 30% to 40%. The air stones 12 are in the form of a disc at a thickness of about 2 mm, and a developer medium and vaporized developer medium permeate these.

Figure 7:
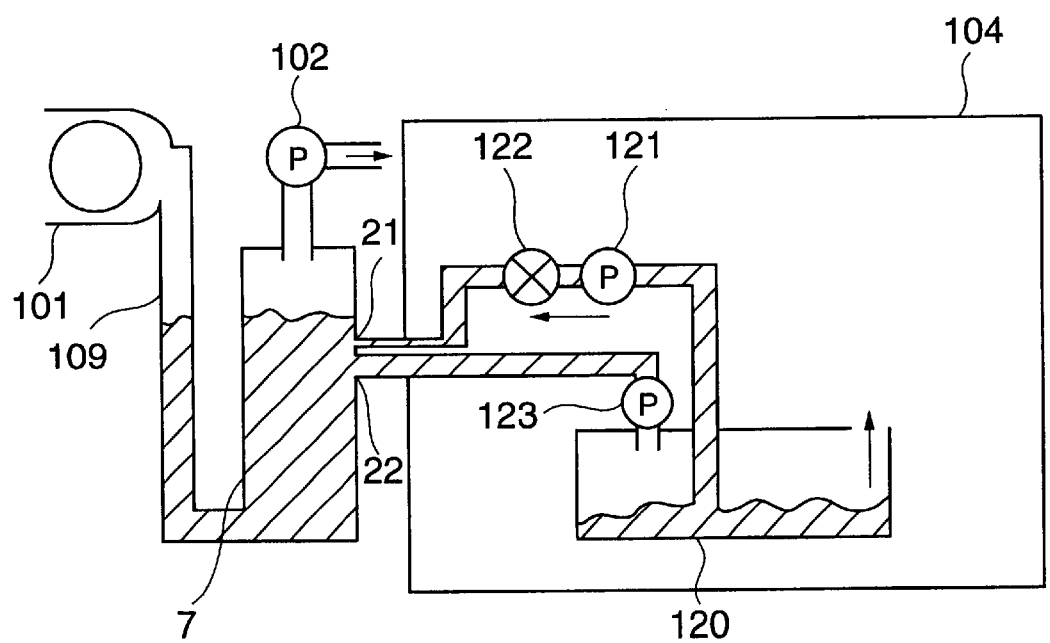
FIG. 7 is a view, showing the operation of the vapor recovery device of developer medium shown in FIG. 3, wherein the developer medium is transferred into a capacitor column at a preparation state.

A recovery port 22 is installed at a location slightly higher than the partition plate 11 at the side of the capacitor column 7, and a supply port 21 is provided at a location higher than the recovery port 22. (The recovery port 22 and the supply port 21 are shown in FIG. 7 and are omitted in FIG. 3.) A developer medium is fed into the capacitor column 7 from the developer producing section 104 through the supply port 21. The developer medium is fed until the medium fills the hollow part 13 and the channel 14, and reaches a water level slightly higher than the air stones 12 to completely soak the air stones 12. The water level is the marginal level without overflowing from the recovery port 22, which is an initial water level in design or an initial liquid level mentioned later.

Hot vaporized developer medium and water vapor (which is the moisture mixed with outside air since the shell space 106 is not perfectly closed) pass through the suction port 2 from the image dryer 110. The vaporized medium and water vapor are then released to a part of the partition plate 11 having no air stones 12 through the channel 14 of the capacitor base 1. The vaporized developer medium from the channel 14 hits the partition plate 11. Subsequently, inside the hollow part 13, the vaporized developer medium is mixed thoroughly with developer medium and is passed through the air stones 12, thus forming uniform and fine bubbles having the developer medium as an interface and remaining in the capacitor column 7. In other words, bubbles are generated, and the hot vaporized developer medium is cooled to promote liquefaction.

The volume of fine bubbles of the bubbled developer medium reaches about 20% to 50% of the volume of the capacitor column 7 by the suction device 102, although the volume depends on the gas quantity of sucking vaporized developer medium. Bubbles are generated by immersing the air stones 12 as a bubble-generating member in the liquid developer medium through which vaporized developer medium is passed.

In this vapor recovery device of developer medium, high liquefaction efficiency is obtained since vapor flows efficiently and air stones are optimized. Thus, the vapor recovery device has a simple structure including one capacitor column shown in FIG. 3, and has high recovery efficiency. Structural characteristics are the mechanism of bubbling with the use of alumina powder and the structure of each part. Four conditions to set the shapes of ceramics and so forth are as follows:

Depending on the particle diameter of alumina powder, the pore diameter of air stones is determined, and the fineness of bubbles is optimized.

The volume of bubbles is determined based on the surface area of the air stones relative to the volume of a capacitor column.

As shown in FIG. 4, the arrangement of the air stones is contrived. High-pressure vaporized developer medium sucked by the suction port 2 one time hits the partition plate 11 having the air stones 12 without releasing the medium directly against the air stones 12, and is diffused by halting the force of the medium within the closed hollow section 13. Thus, the vaporized developer medium passes through the air stones 12 evenly, forming bubbles.

The air stones 12 are formed as thinly as possible, thereby minimizing the pressure loss of an air pump or the like of the suction device 102 for sucking vaporized developer medium. Additionally, the pressure loss of the vapor recovery device as a whole is matched to the rated pressure of the air pump or the like.

Figure 6:
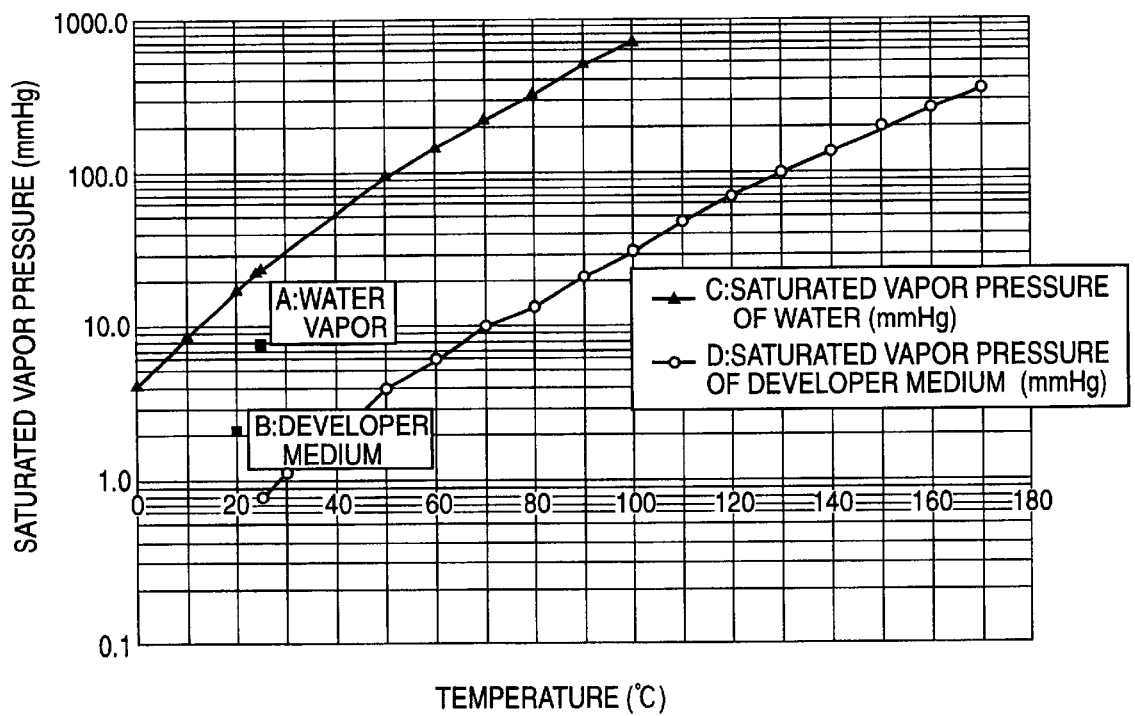
FIG. 6 is a graph, showing relations between saturated vapor pressure and the temperature of vaporized developer medium and water vapor.

This vaporized developer medium is practically a mixed gas containing water vapor. However, by lowering gas pressure at the suction device 102 and cooling hot vaporized medium at the Peltier element 5 to an appropriate temperature, only the vaporized developer medium may be selectively liquefied. The temperature of preliminarily filled developer medium is controlled to lower liquid temperature to an appropriate range based on saturated vapor pressure lines shown in FIG. 6. Thus, vaporized developer medium is changed to liquid while the gaseous state of water vapor is maintained by utilizing the difference in saturated vapor pressures between the water vapor and the vaporized developer medium as two components of the mixed gas. For instance, as shown in FIG. 6, at about 20° C. to 25° C., the vapor pressure of vaporized developer medium is about 2 mmHg, and the vapor pressure of water vapor is about 9 mmHg.

In the continuous printing process of the electrophotographic device, heat is absorbed from the capacitor column 7 by the Peltier element 5, and the heat is radiated by the heat sink 4 and the cooling fan 3. In order to liquefy only vaporized developer medium, the liquid temperature of the developer medium in the capacitor column 7 is controlled to be constant. Accordingly, liquefied and recovered developer medium becomes pure without the condensation of water vapor, so that the medium can well endure reuse processes. The liquefied developer medium is returned to the developing process for image formation. Additionally, since the developer medium is not contaminated by moisture, the medium may be circulated for semi-permanent use.

Furthermore, as the temperature of developer medium is lowered, liquefaction is further promoted. However, as shown in FIG. 6, water vapor condenses at around 10° C. In consideration of errors at a temperature adjusting section, a set temperature is decided upon. For instance, an ordinary temperature around 20° C. may be chosen as the set temperature.

As shown in FIG. 5, the developer medium which is increased by liquefaction inside the capacitor column 7 overflows from the recovery port 22, and is transferred to the developer producing section 104 by a recovery pump 123 (see FIG. 7). Moreover, a suction port 23 at the top of the capacitor column 7 is connected to the shell space 106 through the suction device 102.

Subsequently, the drawings are referred in order to explain the operation of the vapor recovery device of developer medium shown in FIG. 3.

As shown in FIGS. 7 to 11, a cartridge 120 is attached to the developer producing member 104 to store the developer medium. The cartridge 120 is connected to the supply port 21 by e pipe. Along the pipe, a pump for preparation 121 and a valve for preparation 122 are provided to transfer developer medium from the cartridge 120 to the supply port 21. The recovery port 22 is also connected to the cartridge 120 by a pipe, and a recovery pump 123 is provided along the pipe. The cartridge can ventilate in the direction of the arrow.

The vapor recovery device of developer medium shown in FIG. 3 operates as in the following steps (1) to (3).
(1) Preparation (see FIGS. 8 and 9)
Preparation is performed as follows in order to maintain developer medium inside the capacitor column 7 at an initial water level in design (marginal water level without the overflow from the recovery port 22) in consideration of liquefaction efficiency when the electrophotographic device is turned on.

In the first step, as shown in FIG. 7, the valve for preparation 122 is opened. The pump for preparation 121 is then driven to supply developer medium inside the cartridge 120 into the capacitor column 7 up to a predetermined water level, sufficiently exceeding the initial water level in design. At this time, the recovery pump 123 and the air pump of the suction device 102 are inactive. However, when developer medium is supplied into the capacitor column 7, internal pressure increases and a relief valve of the air pump of the suction device 102 opens, bleeding the air. The pump 121 operates as the valve 122 is opened to let the developer medium flow only in a necessary quantity. The operation period of the pump is determined by the capacity of the pump 121.

Figure 8:
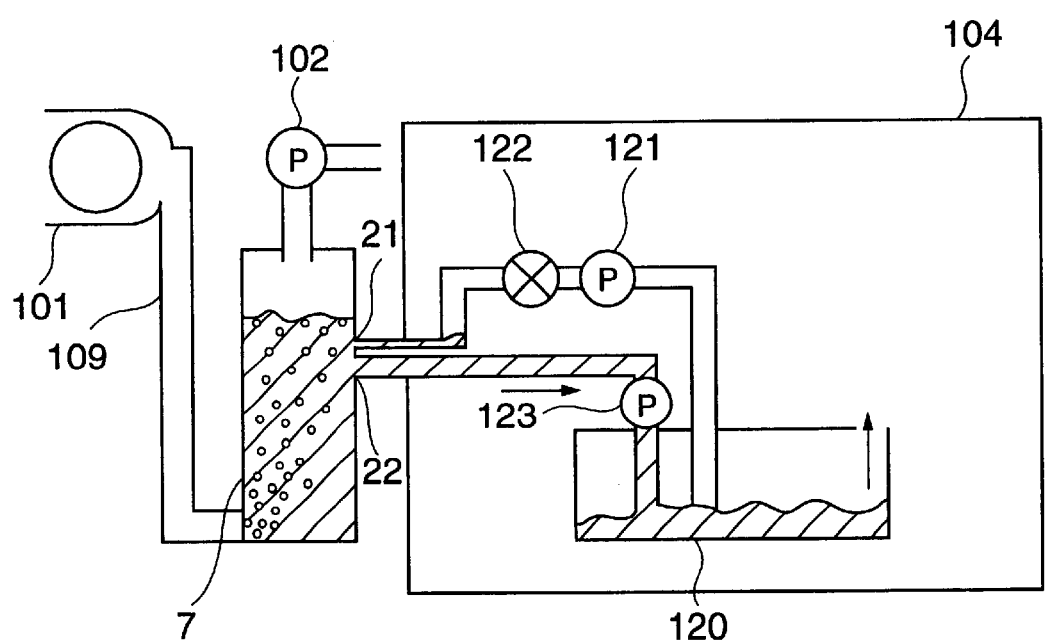
FIG. 8 is a view, showing the operation of the vapor recovery device of developer medium shown in FIG. 3, wherein the developer medium flows out from the capacitor column to a pipe having a recovery pump at the preparation state.

In the second step, as shown in FIG. 8, the valve 122 is shut and the pump 121 is stopped, so that the developer medium flows out from the capacitor column 7 into the pipe toward the recovery pump 123. Then, vaporized developer medium or air enters the capacitor column 7 from the manifold 101 in the same volume as the outflow of this developer medium.

Figure 9:
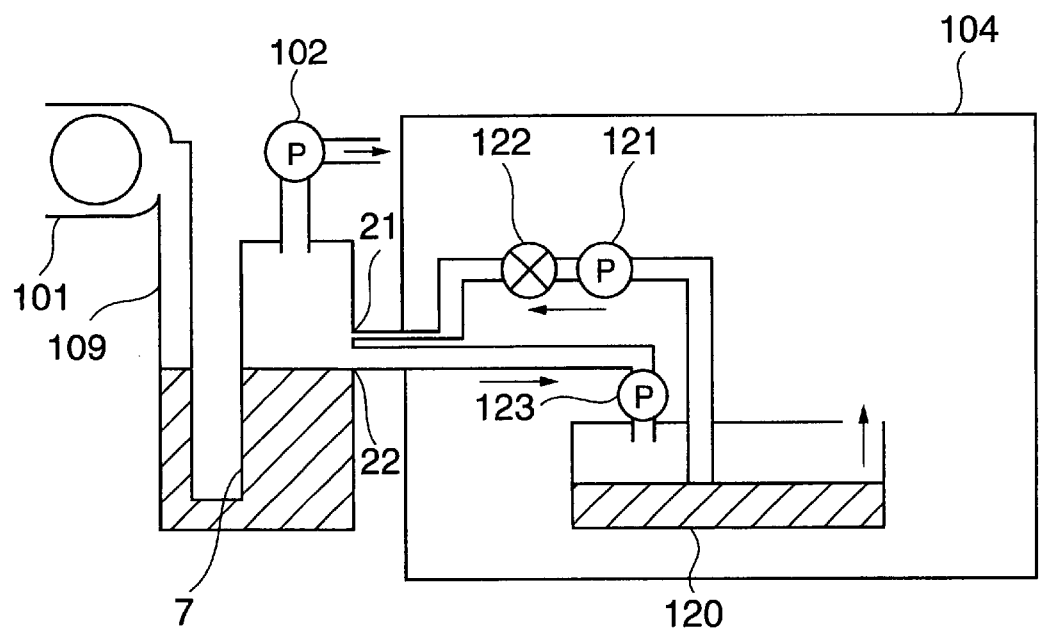
FIG. 9 is a view, showing the operation of the vapor recovery device of developer medium shown in FIG. 3, wherein the preparation state is completed.

In the third step, the recovery pump 123 is driven. The valve 122 is continuously closed, and the pump 121 and the air pump of the suction device 102 are off. At this time, the developer medium overflows by a quantity greater than the initial water level in design, and passes through the recovery pump 123, flowing into the cartridge 120. Then, the pressure inside the capacitor column 7 becomes negative, thus closing the relief valve of the air pump of the suction device 102. The developer medium in the capacitor column 7 returns to the cartridge 120 only in a quantity greater than the initial water level in design. The entire developer medium inside the pipe connected to the capacitor column 7 also flows out to the cartridge 120. Vaporized developer medium or air enters the capacitor column 7 from the manifold 101 in the same volume as the developer medium that flowed out thereby. Accordingly, as shown in FIG. 9, developer medium is left in the capacitor column 7 only up to the initial water level in design. In this condition, the recovery pump 123 is stopped. Moreover, when the developer medium left in the capacitor column 7 is hotter than the set temperature (for example, 20° C.), the developer medium is preliminarily cooled down to the set temperature.

Figure 10:
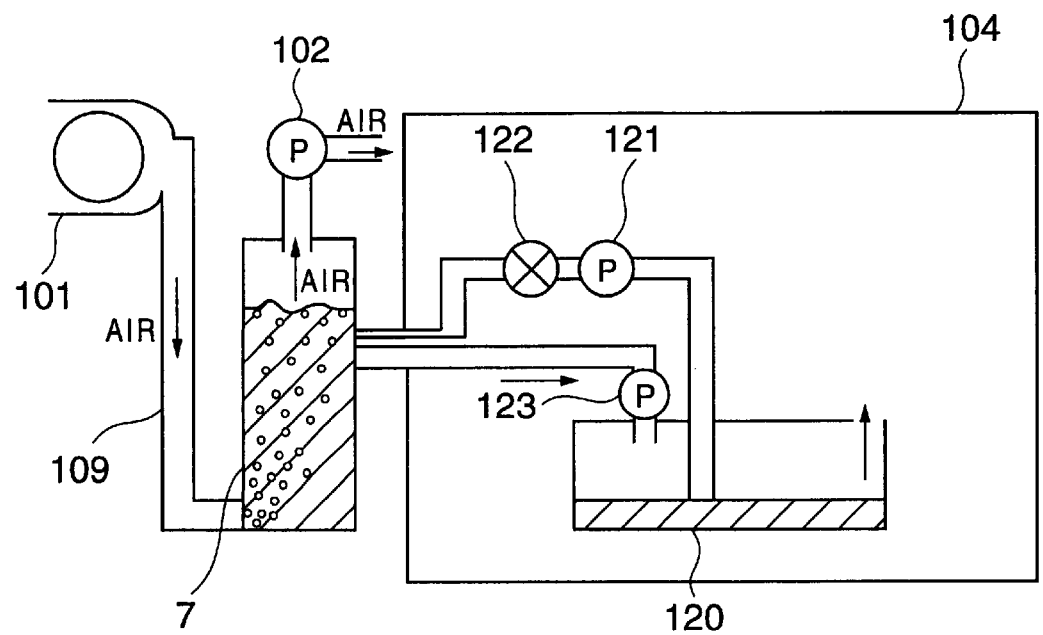
FIG. 10 is a view, showing the operation of the vapor recovery device of developer medium shown in FIG. 3, wherein an electrophotographic device is forming images.
Figure 11:
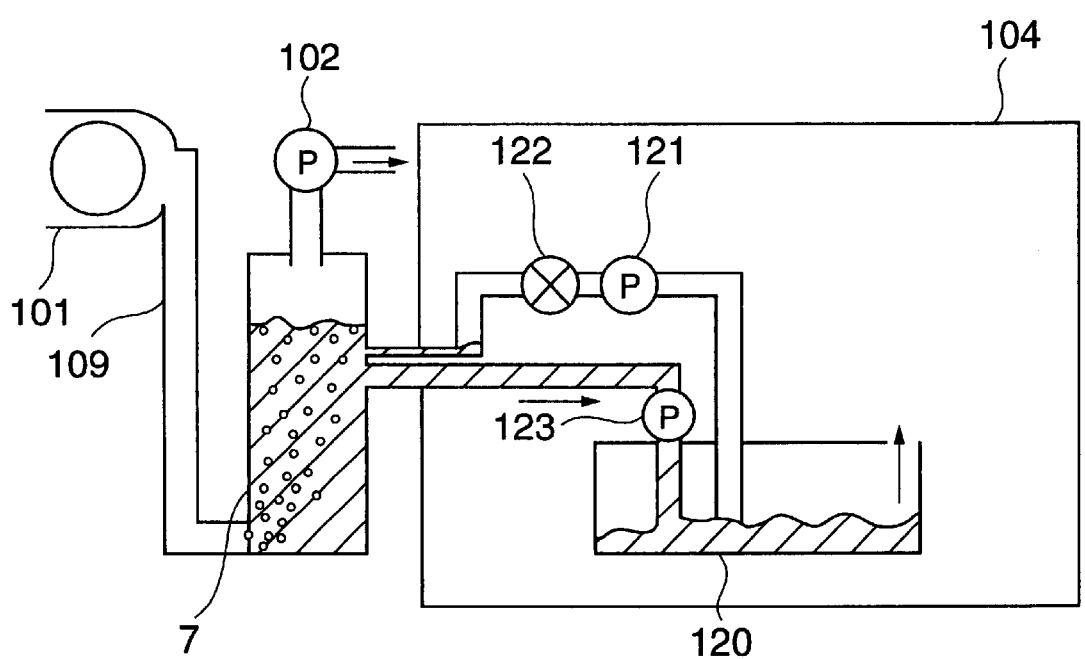
FIG. 11 is a view, showing the operation of the vapor recovery device of developer medium shown in FIG. 3, wherein an increase in the developer medium in the capacitor column is fed into a cartridge at a constant cycle when the electrophotographic device is forming images.

When image formation is paused for a long period after the power is turned on, the developer medium in the capacitor column 7 often decreases due to natural vaporization. In this case, the above-noted operation is repeated to maintain the initial water level in design at the beginning of image formation.
(2) Image Formation
During the image forming process of the electrophotographic device, the air pump of the suction device 102 is turned on, pumping out the vaporized developer medium from the capacitor column 7 to the shell space 106 as shown in FIG. 10. The valve 122 is shut, and the pump 121 and the recovery pump 123 are off. Accordingly, vaporized developer medium is fed into the capacitor column 7 from the manifold 101 through the suction port 2 by the amount sucked by the suction device 102, and is then liquefied.
(3) Processing of Increased Developer Medium
The recovery pump 123 is driven at a constant cycle at the end of image formation. Accordingly, the quantity of developer medium that increases by the liquefaction of vaporized developer medium in the capacitor column 7 during the image formation process of the electrophotographic device, is reduced to the initial water level in design. The excess quantity of the developer medium is transferred to the cartridge 120. During this process, the valve 122, the pump 121 and the air pump of the suction device 102 are off.

The present invention has the following effects.

The vapor recovery device and method of developer medium of the present invention selectively liquefies vaporized developer medium without liquefying water vapor. Accordingly, moisture may be removed from recovered developer medium for reuse.

In other words, the developer medium cooled by the Peltier element 5 is preliminarily filled in the capacitor column 7 shown in FIG. 3. Thus, only vaporized developer medium may be selectively liquefied when the mixture of hot vaporized developer medium and water vapor enters from the suction port 2. The temperature of preliminarily filled developer medium is controlled to cool the liquid temperature to an appropriate range based on the saturated vapor pressure lines shown in FIG. 6. Thus, the gaseous phase of water vapor is maintained while vaporized developer medium is changed into liquid by utilizing the difference in saturated vapor pressures between the water vapor and the vaporized developer medium as two components of the mixed gas.

Accordingly, liquefied and recovered developer medium becomes pure without the condensation of water vapor, so that the medium can well endure reuse processes. The liquefied developer medium is returned to the developing process for image formation. Therefore, since the developer medium is not contaminated by moisture, the medium may be circulated for semi-permanent use.

The vapor recovery device and method of developer medium of the present invention can improve the liquefaction efficiency of vaporized developer medium.

In other words, as in FIG. 3, when hot mixed vapor passes through cooled developer medium inside the capacitor column 7, the vapor is subdivided into bubbles, generating bubbles. The volume then reaches about 20% to 50% of the volume of the capacitor column 7 although the volume depends on the gas quantity to intake the vapor.

Figure 2:
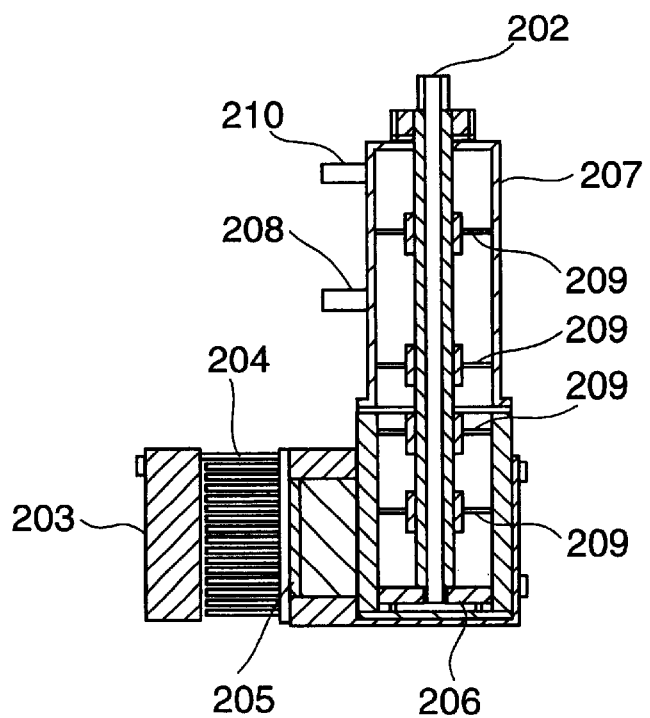
FIG. 2 is a cross-sectional view of the conventional vapor recovery device of developer medium.

In the conventional recovery device of developer medium shown in FIGS. 1 and 2, the metal mesh 206 is used to generate the bubbles. Moreover, the partition plates 209 having 50 holes of about 1 mm in diameter are provided to control liquefaction efficiency by bubbling. In this case, liquefaction efficiency is low, considering the high pressure loss. Accordingly, the gas quantity of mixed vapor passing through each capacitor column 207 has to be suppressed. Additionally, the capacitor is a quadruple multi-column capacitor, which is large and has many parts as shown in FIG. 1.

In the present invention, the liquefaction efficiency of vaporized developer medium is high with the use of air stones. Also, the structure and shape are chosen to provide an efficient and preferable vapor flow, and air stones are optimized, thereby providing the vapor recovery device of developer medium having a simple structure of one column as shown in FIG. 3, with high liquefaction efficiency.

Moreover, in the present invention, developer medium in a capacitor column may be set at around 20° C., and does not have to be cooled to a low temperature of around 5° C. Thus, the condensation of moisture may be prevented, and power use by a cooling device may be reduced.

What is claimed is:

1. A vapor recovery device of developer medium, comprising:

a capacitor column that car, store developer medium at the bottom;

air stones provided at the bottom of the capacitor column;

a suction port to transmit vaporized developer medium to the developer medium, the developer medium and the vaporized developer medium mixing in the bottom of the capacitor column and then passing through the air stones; and a cooling device to cool the developer medium in the capacitor column and the vaporized developer medium to a constant temperature.

2. The vapor recovery device according to claim 1, wherein the air stones are solidified powder of 100 to 150 microns in particle diameter and have 50 microns of average pore diameter and 30% to 40% of porosity.

3. The vapor recovery device according to claim 1, wherein the air stones are solidified ceramic powder.

4. The vapor recovery device according to claim 3, wherein the air stones are composite ceramics in which alumina powder as a main component is sintered.

5. The vapor recovery device according to claim 1, wherein the cooling device keeps the developer medium and the vaporized developer medium at a constant temperature so as to liquefy only the vaporized developer medium in the capacitor column, without liquefying water vapor which is contained in the vaporized developer medium.

6. The vapor recovery device according to claim 5, wherein the constant temperature at the cooling device is ordinary temperature when vapor pressure of the vaporized developer medium in the capacitor column is about 2 mmHg.

7. A vapor recovery device of developer medium, comprising a capacitor column that can store the developer medium at the bottom; air stones provided at openings of a partition plate at the bottom of the capacitor column; a capacitor base which is attached to the bottom of the partition plate at the periphery thereof and which has a hollow section below the air stones and partially below the partition plate; a suction port which is provided at an inner surface of the hollow section to transmit vaporized developer medium toward the bottom of the partition plate having no air stones; and a cooling device to cool the developer medium in the capacitor column and the vaporized developer medium to a constant temperature.

8. The vapor recovery device according to claim 7, wherein the capacitor column is nearly cylindrical and the partition plate is in a disc form; and wherein the air stones are provided at equal intervals on a concentric circumference of the partition plate and the suction port transmits the vaporized developer medium toward the center at the bottom of the partition plate.

9. The vapor recovery device according to claim 7, wherein the cooling device comprises a Peltier element which is connected to the capacitor base, a heat sink which is connected to the Peltier element, and a cooling fan to radiate heat from the heat sink.

10. A vapor recovery device of developer medium that absorbs only the developer medium scattered in toner images on a photoreceptor of an electrophotographic device by an image dryer and recovers vaporized developer medium, comprising:

a capacitor column that can store the developer medium at the bottom; air stones provided at the bottom of the capacitor column; a suction port to transmit the vaporized developer medium to the bottom of the air stones; a cooling device to cool the developer medium in the capacitor column and the vaporized developer medium to a constant temperature; a suction device to suck the vaporized developer medium inside the capacitor column and transmit it into a shell space having the photoreceptor and the image drier inside; a pipe which connects the image drier to the suction port to transmit the vaporized developer medium absorbed by the image drier to the suction port; and a recovery device to transmit the developer medium inside the capacitor column by an additional amount which is greater than an initial constant liquid level and thus overflows, to a developer medium storage section.

11. The vapor recovery device according to claim 10, comprising a supply device to transmit the developer medium from the developer medium storage section into the capacitor column.

12. A vapor recovery method of developer medium, comprising the steps of:

storing the developer medium at a bottom of a capacitor column having air stones at the bottom;

transmitting vaporized developer medium to the bottom of the developer medium to mix the vaporized medium and the developer medium;

transmitting the mixed vaporized developer medium and the developer medium through the air stones, thus subdividing the vaporized developer medium into bubbles in the developer medium inside the capacitor column for cooling and liquefying.

13. A vapor recovery method of developer medium, comprising the steps of:

transmitting developer medium by a quantity greater than an initial constant liquid level into a capacitor column which can store the developer medium at the bottom, by operating a supply device when an electrophotographic device is started; cooling the developer medium stored in the capacitor column and the vaporized developer medium to a constant temperature by a cooling device; transmitting the developer medium to a developer medium storage section from the capacitor column by a recovery device while leaving only a quantity at the initial liquid level; transmitting the vaporized developer medium inside the capacitor column by a suction device into a shell space internally having a photoreceptor of the electrophotographic device and an image drier while the electrophotographic device is forming images; sucking the vaporized developer medium absorbed by the image drier into the capacitor column from a suction port below air stones at the bottom of the capacitor column; and starting the recovery device by turning off the suction device at a constant cycle after image forming operations end, thus delivering the developer medium inside the capacitor column into the developer medium storage section while only the quantity at the initial liquid level is kept.

14. The method according to claim 13, wherein the supply device is working even when the electrophotographic device starts to form images.

* * * * *